(12) United States Patent
Mukawa et al.

(10) Patent No.: US 7,994,239 B2
(45) Date of Patent: Aug. 9, 2011

(54) AROMATIC POLYCARBONATE RESIN COMPOSITION AND MOLDED ARTICLE THEREOF

(75) Inventors: Naosuke Mukawa, Chiba (JP); Yusuke Hayata, Chiba (JP); Akio Nodera, Chiba (JP); Hiroshi Yasuda, Chiba (JP); Keiichi Watanabe, Chiba (JP)

(73) Assignee: Idemitsu Kosan Co., Ltd, Tokyo (JP)

( * ) Notice: Subject to any disclaimer, the term of this patent is extended or adjusted under 35 U.S.C. 154(b) by 146 days.

(21) Appl. No.: 12/249,287

(22) Filed: Oct. 10, 2008

(65) Prior Publication Data

US 2009/0105378 A1    Apr. 23, 2009

(30) Foreign Application Priority Data

Oct. 11, 2007   (JP) ................. 2007-265345

(51) Int. Cl.
    C08K 11/00    (2006.01)
    C08L 89/00    (2006.01)
    C08L 97/02    (2006.01)
    C08L 67/00    (2006.01)
    C08G 63/91    (2006.01)
    C08F 283/02   (2006.01)
    B24D 11/00    (2006.01)
    B29C 65/00    (2006.01)
    B32B 37/00    (2006.01)

(52) U.S. Cl. ............ 524/9; 525/415; 525/466; 156/279

(58) Field of Classification Search ...... 524/9; 525/415; 525/466; 156/279
    See application file for complete search history.

(56) References Cited

U.S. PATENT DOCUMENTS

| | | | | |
|---|---|---|---|---|
| 4,897,453 A | * | 1/1990 | Flora et al. ................ | 525/439 |
| 5,206,087 A | * | 4/1993 | Tokiwa et al. .............. | 428/403 |
| 5,239,020 A | * | 8/1993 | Morris ...................... | 525/439 |
| 5,420,212 A | * | 5/1995 | Light ........................ | 525/411 |
| 5,478,896 A | * | 12/1995 | Scott ....................... | 525/439 |
| 6,011,124 A | * | 1/2000 | Scott et al. ................. | 525/439 |
| 6,071,984 A | * | 6/2000 | Grigat et al. ............... | 523/128 |
| 6,281,299 B1 | * | 8/2001 | Saito et al. ................ | 525/439 |
| 6,476,158 B1 | * | 11/2002 | England et al. .............. | 525/466 |
| 7,445,835 B2 | * | 11/2008 | Serizawa et al. ............ | 428/297.4 |
| 7,504,452 B2 | * | 3/2009 | Hayata et al. ............... | 524/462 |
| 2005/0136259 A1 | * | 6/2005 | Mohanty et al. ............. | 428/409 |
| 2006/0084728 A1 | * | 4/2006 | Barone et al. ............... | 524/10 |
| 2006/0276582 A1 | | 12/2006 | Mochizuki et al. | |
| 2007/0173618 A1 | * | 7/2007 | Shaikh et al. ............... | 525/466 |
| 2008/0033077 A1 | * | 2/2008 | Hashimoto et al. .......... | 524/9 |
| 2008/0051508 A1 | * | 2/2008 | Hayata et al. ............... | 525/68 |
| 2008/0071015 A1 | * | 3/2008 | Kiuchi et al. ................ | 524/261 |
| 2008/0071038 A1 | * | 3/2008 | Ido ........................... | 525/450 |
| 2008/0108754 A1 | * | 5/2008 | Hayata et al. ............... | 525/191 |
| 2008/0262151 A1 | * | 10/2008 | Ishii et al. .................. | 524/599 |
| 2009/0076195 A1 | * | 3/2009 | Nodera et al. .............. | 523/512 |
| 2009/0092833 A1 | * | 4/2009 | Schmitt et al. ............. | 428/378 |
| 2009/0209695 A1 | * | 8/2009 | Yu et al. ................... | 524/451 |
| 2009/0239983 A1 | * | 9/2009 | Nodera et al. .............. | 524/145 |
| 2010/0004358 A1 | * | 1/2010 | Hashiba ..................... | 524/13 |

FOREIGN PATENT DOCUMENTS

| | | |
|---|---|---|
| EP | 1 792 941 A1 | 6/2007 |
| JP | 2004-359939 | 12/2004 |
| WO | WO 2006030951 A1 * | 3/2006 |

OTHER PUBLICATIONS

Serizawa et al. Journal of Applied Polymer Science, vol. 100, 618-624, 2006.*
Kefi, Kenaf and Hemp Natural Fibers-physical and chemical characteristics, 2011.*

* cited by examiner

*Primary Examiner* — Mark Eashoo
*Assistant Examiner* — Liam J Heincer
(74) *Attorney, Agent, or Firm* — Oblon, Spivak, McClelland, Maier & Neustadt, L.L.P.

(57) ABSTRACT

Provided is an aromatic polycarbonate resin composition including a combination composed of 98 to 1 mass % of an aromatic polycarbonate (A), 1 to 98 mass % of an aliphatic polyester (B), and 1 to 80 mass % of an organic filler derived from a natural product (C), the aromatic polycarbonate resin composition being obtained by suppressing increase in density of an aromatic polycarbonate resin composition containing an aliphatic polyester, while improving rigidity and fluidity thereof and ameliorating poor external appearance such as pearly luster.

16 Claims, No Drawings

AROMATIC POLYCARBONATE RESIN COMPOSITION AND MOLDED ARTICLE THEREOF

TECHNICAL FIELD

The present invention relates to an aromatic polycarbonate resin composition and a molded article thereof. More specifically, the present invention relates to an aromatic polycarbonate resin composition which contains an aromatic polycarbonate, an aliphatic polyester, and an organic filler derived from a natural product at a specific ratio, suppresses increase in density, is excellent in fluidity and rigidity, and has good external appearance, and a molded article formed thereof. The resin composition can be utilized in an office automation apparatus field, an information and telecommunications device field, a household electric appliance field, and the like.

BACKGROUND ART

A polycarbonate resin is excellent in mechanical properties such as impact resistance and is also excellent in heat resistance and transparency, and therefore, the polycarbonate resin is used in various fields such as an electric field, an electronic field, an office automation apparatus field, a machine field, and an automobile field. However, there is a problem that a raw material of the polycarbonate resin is derived from petroleum, so environmental load thereof is large, which has recently been a problem, from the viewpoint of degradability of the polycarbonate resin after use.

On the other hand, there are many aliphatic polyester resins which have biodegradability, and those resins have been greatly drawing attention from the viewpoint of concern for the environment after use. In particular, from the point that a polylactic acid resin made from a raw material derived from a plant such as corn or sugarcane is finally decomposed into water and carbon dioxide (carbon neutral), the environmental load can be decreased, and thus, a development of the polylactic acid resin is being undertaken as an environment-responsive resin. Further, the polylactic acid resin has high melting point as a plant-based plastic and is capable of being melt-molded, and hence utilization of the polylactic acid resin is expected as a plant-based and biodegradable resin excellent in practical use. Further, there are also some resins among aliphatic polyester resins derived from petroleum, in which a part to the whole of the raw materials thereof are to be changed to plant-derived ones in the future, which has been drawing attention.

However, the aliphatic polyester resins including a polylactic acid are low in mechanical physical properties especially heat resistance, and therefore, it is difficult to use a single aliphatic polyester resin as a molded article in the part which requires mechanical strength.

Hence, there has been an attempt to solve the above-mentioned problems by alloying the aliphatic polyester resin with an aromatic polycarbonate.

On the other hand, as one of the methods of improving mechanical properties and heat resistance of the aliphatic polyester resins, a method of using inorganic fillers such as a glass fiber and a carbon fiber has been studied. However, a large amount thereof needs to be added to the aliphatic polyester resins, and thus, there are problems in that: fluidity of the composition is decreased; density of the molded article is increased; residual materials that result in wastes when they are incinerated or discarded are increased and environmental load is increased; and the like. Accordingly, utilization of an organic filler has been studied, and for example, Patent Document 1 describes that an organic filler derived from a natural product is added to a polyester resin including a polylactic acid. However, the Patent Document 1 also describes that a resin composition not having a polymer containing an epoxy group-containing vinylic unit has inferior moldability and surface appearance.

Hence, there has not yet been known any aromatic polycarbonate resin composition which has small density, is excellent in rigidity and fluidity, and has good external appearance.

Patent Document 1: JP 2006-117768 A

DISCLOSURE OF THE INVENTION

Problems to be Solved by the Invention

It is an object of the present invention to provide an aromatic polycarbonate resin composition, in which increase in density of an aromatic polycarbonate resin composition containing an aliphatic polyester is suppressed, while rigidity and fluidity thereof is improved and poor external appearance such as pearly luster is ameliorated.

Means for Solving the Problems

The inventors of the present invention have intensively studied and found that an aromatic polycarbonate resin composition which achieves the above object can be obtained by compounding an organic filler derived from a natural product to an aromatic polycarbonate resin composition containing an aliphatic polyester. The present invention has been accomplished based on those findings.

That is, the present invention provides the following:
1. An aromatic polycarbonate resin composition including a combination composed of: 98 to 1 mass % of an aromatic polycarbonate (A); 1 to 98 mass % of an aliphatic polyester (B); and 1 to 80 mass % of an organic filler derived from a natural product (C);
2. The aromatic polycarbonate resin composition according to the item 1 including a combination composed of: 80 to 20 mass % of the aromatic polycarbonate (A); 17 to 70 mass % of the aliphatic polyester (B); and 3 to 40 mass % of the organic filler derived from a natural product (C);
3. The aromatic polycarbonate resin composition according to the item 2 including a combination composed of: 80 to 50 mass % of the aromatic polycarbonate (A); 17 to 50 mass % of the aliphatic polyester (B); and 3 to 30 mass % of the organic filler derived from a natural product (C);
4. The aromatic polycarbonate resin composition according to item 1, in which the aliphatic polyester (B) includes at least one kind selected from polylactic acid, polybutylene succinate, polybutylene adipate, and polycaprolactone.
5. The aromatic polycarbonate resin composition according to item 1, in which the organic filler derived from a natural product (C) is obtained through to filament-pelletization and has an average fiber length of 3 to 12 mm;
6. The aromatic polycarbonate resin composition according to the item 5, in which the organic filler derived from a natural product (C) is obtained by subjecting at least one kind selected from jute fiber, rayon fiber, bamboo fiber, kenaf fiber, and hemp fiber to filament-pelletization.
7. The aromatic polycarbonate resin composition according to item 1 further including 0.01 to 10 parts by mass of at least one kind selected from a carbodiimide compound, an epoxy compound, an isocyanate compound, and an oxazoline compound (D) with respect to 100 parts by mass of the combination composed of the aromatic polycarbonate (A), the aliphatic polyester (B), and the organic filler derived from a natural product (C); and 8. A molded article formed of the aromatic polycarbonate resin composition according to item 1.

Effects of the Invention

According to the present invention, the aromatic polycarbonate resin composition can be provided, the aromatic polycarbonate resin composition being obtained by suppressing increase in density of the aromatic polycarbonate resin composition containing an aliphatic polyester, while improving rigidity and fluidity thereof and ameliorating poor external appearance such as pearly luster.

BEST MODE FOR CARRYING OUT THE INVENTION

Hereinafter, the present invention is described in detail.

An aromatic polycarbonate resin composition of the present invention includes a combination composed of 98 to 1 mass % of an aromatic polycarbonate (A), 1 to 98 mass % of an aliphatic polyester (B), and 1 to 80 mass % of an organic filler derived from a natural product (C).

An aromatic polycarbonate (A) (PC) to be used in the present invention is not particularly limited, and various aromatic polycarbonates can be exemplified. In general, an aromatic polycarbonate produced by a reaction between a dihydric phenol and a carbonate precursor can be used. That is, the aromatic polycarbonate produced from the dihydric phenol and the carbonate precursor by a solution method or a melting method, i.e., a reaction of the dihydric phenol with phosgene or a transesterification of the dihydric phenol with a diphenyl carbonate and the like can be used.

Various examples are given as the dihydric phenol. Specific examples thereof particularly include 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone.

Particularly preferred examples of the dihydric phenol include bis(hydroxypheyl)alkane-based dihydric phenols and in particular, a dihydric phenol formed of bisphenol A as a main raw material is preferred. Further, examples of the carbonate precursor include a carbonyl halide, carbonyl ester, and a haloformate. Specific examples include phosgene, dihaloformate of a dihydric phenol, diphenyl carbonate, dimethyl carbonate, and diethyl carbonate. Other examples of the dihydric phenol include hydroquinone, resorcin, and catechol. One kind of those dihydric phenols may be used alone, or two or more kinds thereof may be used in mixture.

The polycarbonate (A) used in the present invention may have a branched structure and examples of a branching agent include 1,1,1-tris(4-hydroxyphenyl)ethane, $\alpha,\alpha',\alpha''$-tris(4-hydroxyphenyl)-1,3,5-triisopropylbenzene, phloroglucin, trimellitic acid, and isatinbis(o-cresol). In addition, for adjusting the molecular weight, used are phenol, p-t-butylphenol, p-t-octylphenol, p-cumylphenol, and the like.

Further, the aromatic polycarbonate (A) to be used in the present invention may be a copolymer containing a polycarbonate part and a polyorganosiloxane moiety or a polycarbonate containing the copolymer. Further, the aromatic polycarbonate (A) may also be a polyester-polycarbonate resin obtained by performing polymerization of a polycarbonate in the presence of an ester precursor such as bifunctional carboxylic acid e.g., terephthalic acid, or an ester-forming derivative thereof. Further, a mixture of various polycarbonates can be used. The aromatic polycarbonate (A) to be used in the present invention preferably does not substantially contain halogen in a structure thereof. Further, from the viewpoint of mechanical strength and moldability of the aromatic polycarbonate resin composition, a viscosity average molecular weight of the aromatic polycarbonate (A) is 10,000 to 100,000, preferably 11,000 to 40,000, and particularly preferably 12,000 to 25,000.

A compounding ratio of the aromatic polycarbonate (A) contained in the aromatic polycarbonate resin composition of the present invention is, based on the total amount of components (A), (B), and (C), 98 to 1 mass %, preferably 80 to 20 mass %, and more preferably 80 to 50 mass %.

When the compounding ratio of the aromatic polycarbonate (A) is less than 1 mass %, heat distortion temperature of the aromatic polycarbonate resin composition remarkably lowers, and when the compounding ratio exceeds 98 mass %, rigidity and fluidity of the aromatic polycarbonate resin composition do not improve.

As the aliphatic polyester (B) contained in the aromatic polycarbonate resin composition of the present invention, there can be used a polylactic acid, a copolymer of a lactic acid and a hydroxy carboxylic acid, a polyester using an aliphatic diol and an aliphatic dicarboxylic acid as raw materials, polycaprolactone, and the like. Further, the aliphatic polyester (B) may also be a copolymer of aliphatic polyesters which are different from each other.

The polylactic acid is synthesized by ring-opening polymerization from cyclic dimer of lactic acid, which is normally called lactide, and the production methods thereof are disclosed in U.S. Pat. Nos. 1,995,970, 2,362,511, 2,683,136, and the like.

Further, the copolymer of a lactic acid and another hydroxycarboxylic acid are normally synthesized by ring-opening polymerization from a cyclic ester intermediate of lactide and hydroxycarboxylic acid, and the production methods thereof are disclosed in U.S. Pat. Nos. 3,635,956, 3,797,499, and the like.

When a lactic acid resin is produced by direct dehydration polycondensation rather than by ring-opening polymerization, a lactic acid resin with a suitable degree of polymerization for the present invention can be obtained by the polymerization through methods of: performing azeotropic dehydration condensation of a lactic acid and, if required, another hydroxycarboxylic acid, in the presence of, preferably an organic solvent, particularly a phenyl ether solvent; and particularly preferably removing water from the solvent after azeotropic distillation and by returning the solvent, which contains substantially no water, to the reaction system.

For the lactic acid as a raw material, any of L- and D-lactic acids, a mixture thereof, or lactide which is a dimer of lactic acid can be employed.

Further, examples of the other hydroxycarboxylic acids which can be used in combination with the lactic acid include glycolic acid, 3-hydroxybutyric acid, 4-hydroxybutyric acid, 4-hydroxyvaleric acid, 5-hydroxyvaleric acid, and 6-hydroxycaproic acid, and, further include a cyclic ester intermediate of hydroxycarboxylic acid such as glycolide, which is a dimer of glycolic acid, or $\epsilon$-caprolacton, which is a cyclic ester of 6-hydroxycaproic acid.

When producing a lactic acid resin, a suitable molecular weight controlling agent, chain branching agent, and another modifying agent may be compounded.

The lactic acids and the hydroxycarboxylic acids as copolymer components may be used alone or two or more kinds thereof may be used in combination, and further, the obtained lactic acid resins may be used in combination of two or more kinds thereof.

Examples of the aliphatic diol include glycol compounds such as ethylene glycol, propylene glycol, 1,3-propanediol, 1,3-butanediol, 1,4-butanediol, heptanediol, hexanediol, octanediol, nonanediol, decanediol, 1,4-cyclohexanedimethanol, neopentyl glycol, glycerin, pentaerythritol, polyethylene glycol, polypropylene glycol, and polytetramethylene glycol. They may be used singly or two or more kinds may be used in combination.

Further, examples of the aliphatic dicarboxylic acid include dicarboxylic acids such as oxalic acid, succinic acid, adipic acid, sebacic acid, azelaic acid, dodecanedioic acid, malonic acid, glutaric acid, cyclohexane dicarboxylic acid, anthracene dicarboxylic acid, 4,4'-diphenylether dicarboxylic acid, 5-sodium sulfoisophthalic acid, and 5-tetrabutyl phosphonium isophthalic acid, and dimethylesters thereof. They may be used singly or two or more kinds may be used in combination.

Specific examples of polyesters having the above aliphatic diols and aliphatic dicarboxylic acids as raw materials include polybutylene sebacate, polypropylene sebacate, polyethylene sebacate, polyethylene glycol, polyethylene oxalate, polypropylene oxalate, polybutylene oxalate, polyneopentyl glycol oxalate, polyethylene succinate, polypropylene succinate, polybutylene succinate, polybutylene adipate, polypropylene adipate, and polyethylene adipate. Of those, polybutylene succinate and polybutylene adipate are preferred.

As the aliphatic polyester (B) of the present invention, a polylactic acid is excellent in terms of fluidity and thermal and mechanical physical properties, and an aliphatic polyester having a large molecular weight is preferred and an aliphatic polyester having a weight average molecular weight of 30,000 or more is more preferred.

Specifically, the aliphatic polyester (B) of the present invention is preferably at least one kind selected from a polylactic acid, polybutylene succinate, polybutylene adipate, and polycaprolactone.

A compounding ratio of the aliphatic polyester (B) contained in the aromatic polycarbonate resin composition of the present invention is, based on the total amount of components (A), (B), and (C), 1 to 98 mass %, preferably 17 to 70 mass %, and more preferably 17 to 50 mass %. When the compounding ratio of the aliphatic polyester (B) is less than 1 mass %, fluidity and rigidity of the aromatic polycarbonate resin composition do not improve, and when the compounding ratio exceeds 98 mass %, heat distortion temperature of the aromatic polycarbonate resin composition remarkably lowers.

The organic filler derived from a natural product (C) to be used in the present invention is not particularly limited as long as the organic filler is derived from a natural product, and preferably contains cellulose.

Specific examples of the organic filler derived from a natural product (C) of the present invention include: organic fillers in a chip form such as rice husk, wood chip, bean curd refuse, used paper pulverized material, and clothes pulverized material; organic fillers in a fiber form such as plant fibers e.g., cotton fiber, cannabis fiber, bamboo fiber, wood fiber, kenaf fiber, hemp fiber, jute fiber, rayon fiber, banana fiber, and coconut fiber, cellulose fibers processed from those plant fibers e.g., pulp and rayon, and animal fibers e.g., silk, wool, angora, cashmere, and camel; and organic fillers in a powder form such as paper powder, wood powder, bamboo powder, cellulose powder, rice husk powder, fruit husk powder, chitin powder, chitosan powder, protein, and starch. From the viewpoint of heat resistance, preferred are: organic fillers in a powder form such as paper powder, wood powder, bamboo powder, cellulose powder, rice husk powder, fruit husk powder, chitin powder, chitosan powder, protein powder, and starch; and plant fibers such as cotton fiber, cannabis fiber, bamboo fiber, wood fiber, kenaf fiber, hemp fiber, jute fiber, banana fiber, and coconut fiber. More preferred are paper powder, wood powder, bamboo powder, bamboo fiber, kenaf fiber, hemp fiber, jute fiber, and rayon fiber, and still more preferred are bamboo fiber, kenaf fiber, hemp fiber, jute fiber, and rayon fiber. Further, a substance directly obtained from a natural product may be used as the organic fillers derived from a natural product (C), but from the viewpoints of protection of the global environment and resources conservation, waste materials such as used paper, waste wood, and used clothes may be recycled and used. Examples of the used paper include: newspapers, magazines, and OA paper such as copying paper; another regenerated pulp; and paperboard such as corrugated board, cardboard, and paper tube. Any of those may be used as long as they are processed using a plant fiber as a raw material, and from the viewpoint of heat resistance of the aromatic polycarbonate resin composition, a pulverized product of the paper board such as corrugated board, cardboard, and paper tube is preferred. Further, specific examples of the wood include coniferous woods such as pine, Japanese cedar, Japanese cypress, and Japanese fir, and broad-leaved woods such as Japanese beech, Castanopsis, and eucalyptus, but the kinds thereof are not considered.

The organic fillers derived from a natural product (C) may be subjected to surface treatment, and it is preferred to use the organic filler derived from a natural product (C) which is subjected to surface treatment by various known methods such as alkali treatment, heat treatment, acetylation treatment, cyanoethylation treatment, silane coupling treatment, and glyoxale treatment, because mechanical properties of the aromatic polycarbonate resin composition as well as heat resistance thereof tend to be improved.

Paper powder to be used as the organic filler derived from a natural product (C) is not particularly limited as long as the paper powder satisfies the requirements regulated in the present invention, and an adhesive is preferably included from the point that the heat resistance of the aromatic polycarbonate resin composition can be improved. The adhesive is not particularly limited as long as it is generally used when paper is processed, and examples thereof include: an emulsion-type adhesive such as a vinyl acetate resin-based emulsion adhesive or acrylic resin-based emulsion adhesive; a polyvinyl alcohol-based adhesive; a cellulose-based adhesive; a natural rubber-based adhesive; a starch glue; and a hot melt adhesive such as an ethylene vinylacetate copolymer-based adhesive or a polyamide-based adhesive. Preferred are an emulsion-type adhesive, a polyvinyl alcohol-based adhesive, and a hot melt adhesive, and more preferred are an emulsion-type adhesive and a polyvinyl alcohol-based adhesive. Note that those adhesives are each also used as a binder for paper processing agent. Further, an inorganic filler is preferably contained in the adhesive, such as clay, talc, kaolinite, montmorillonite, mica, synthetic mica, zeolite, silica, graphite, carbon black, magnesium oxide, calcium oxide, titanium oxide, calcium sulfide, magnesium carbonate, calcium carbonate, barium carbonate, barium sulfate, aluminum oxide, and neodymium oxide, and more preferred are clay, talc, kaolinite, montmorillonite, synthetic mica, and silica.

The organic filler derived from a natural product (C) has, from the point that the heat resistance can be improved, an ash content of preferably 5 mass % or more, more preferably 5.5 mass % or more, and still more preferably 7.5 mass % or more. The upper limit thereof is not particularly limited, and is preferably 60 mass % or less and more preferably 30 mass % or less. Here, "ash content" refers to a ratio of a mass of the ash content remained after the organic filler is baked using an electric furnace or the like at high temperature of 450° C. or higher for 8 hours with respect to a mass of paper powder before baking.

Further, in terms of improving heat resistance, the organic filler derived from a natural product (C) preferably contains at least one kind selected from aluminum, silicon, calcium, sulfur, magnesium, and titanium, more preferably contains all of aluminum, silicon, and calcium, still more preferably contains all of aluminum, silicon, calcium, and sulfur, and particularly preferably contains all of aluminum, silicon, calcium, sulfur, and magnesium.

In addition, it is preferred that the amount of aluminum be larger than the amount of magnesium, it is more preferred that the amount of aluminum and the amount of silicon be each larger than the amount of magnesium, and it is still more preferred that the amount of aluminum, the amount of silicon, and the amount of calcium be each larger than the amount of magnesium. An abundance ratio among aluminum, silicon, calcium, sulfur, magnesium, and titanium is not particularly limited, and for example, when the total quantity of the above elements is defined as 100, it is preferred that aluminum be 1 to 60%, silicon be 20 to 90%, calcium be 1 to 30%, sulfur be 1 to 20%, magnesium be 0 to 20%, and titanium be 0 to 20%, it is more preferred that aluminum be 1 to 50%, silicon be 20 to 85%, calcium be 1 to 20%, sulfur be 1 to 15%, magnesium be 0 to 10%, and titanium be 0 to 10%, and it is still more preferred that aluminum be 3 to 50%, silicon be 25 to 80%, calcium be 3 to 20%, sulfur be 2 to 10%, magnesium be 0 to 8%, and titanium be 0 to 3%. The analysis of those elements may be determined by using any one of a unit of the organic filler derived from a natural product (C) and the ash content of the organic filler derived from a natural product (C), and the ash content is preferably used. Note that the elemental analysis can be determined by using an apparatus which is obtained by combining a fluorescent X-ray analysis, an atomic absorption method, a scanning electron microscope (SEM), or a transmission electron microscope (TEM), and an energy dispersive X-ray microanalyzer (XMA), and in the present invention, values are determined by using the X-ray analysis.

Further, the organic filler derived from a natural product (C) preferably contains cellulose, a surface of which fine particles are adhered to, from the point that the heat resistance can be improved. The fine particles are not particularly limited, may be organic substances or inorganic substances, and may be fine particles which are generated by adhesion of the above-mentioned various chemicals. A form of each of the fine particles may be any of needle-like, plate-like, and spherical forms. The size of each of the fine particles is not particularly limited, and is preferably distributed in the range of 0.1 to 5,000 nm, more preferably distributed in the range of 0.3 to 1,000 nm, still more preferably distributed in the range of 0.5 to 500 nm, particularly preferably distributed in the range of 1 to 100 nm, and most preferably distributed in the range of 1 to 80 nm. As used herein, the term "distributed" in a specific range means that 80% or more of the total number of the fine particles belong to the specific range. The adhesion state of the fine particles may be any of an agglomeration state and a dispersion state, and the fine particles being adhered in the dispersion state is more preferred. The size of the fine particles can each be determined by observing a molded article to be obtained from the resin composition of the present invention with a transmission electron microscope at 80,000-fold magnification.

The organic filler derived from a natural product (C) which is impregnated with an aliphatic polyester beforehand and subjected to filament-pelletization can be used. As the aliphatic polyester which the organic filler derived from a natural product (C) is impregnated with, the same substance as the aliphatic polyester (B) can be used, and a polylactic acid is preferably used.

The filament-pelletization is performed by using, as main raw materials, at least an aliphatic polyester which can be melt-molded and the organic filler derived from a natural product (C). In this case, a production process thereof is not particularly limited and there may be employed, for example: a melt-kneading method using a general biaxial kneader (method of kneading the organic filler derived from a natural product (C) and a resin in a molten state); a method involving impregnating the organic filler derived from a natural product (C) with the molten aliphatic polyester and then cooling and cutting the resultant; a method involving adhering resin powder to the organic filler derived from a natural product (C) by a dry method or a wet method, melting the adhered resin, and then cooling and cutting the resultant; and a method of using a filament-pellet producing apparatus (e.g., filament-pellet producing apparatus manufactured by Kobe Steel, Ltd.). The filament-pellets are preferably produced by using the filament-pellet producing apparatus.

In producing the filament-pellet, it is required that the aliphatic polyester be capable of being molten in any cases of the production methods. Further, in obtaining the aromatic polycarbonate resin composition according to the present invention from an intermediate material such as the filament pellet, it is required that the intermediate material be capable of being subjected to molding processing such as injection molding. In the present invention, the reason why the aliphatic polyester is made capable of being melt-molded is to satisfy the requirement. Note that the aliphatic polyester used for the filament-pelletization and the aliphatic polyester (B) used for the aromatic polycarbonate resin composition of the present invention may be identical to or different from each other.

When the organic filler derived from a natural product (C) is subjected to filament-pelletization, the longer a fiber length of the organic filler derived from a natural product (C), the longer a fiber length of a fiber contained in an aromatic polycarbonate resin composition to be obtained after the molding processing, and hence mechanical physical properties thereof are improved. Therefore, the longer the fiber length of the organic filler derived from a natural product (C), the better, and in the filament-pellet, for example, it is desirable that the fiber length of the organic filler derived from a natural product (C) be about the same as a pellet length.

Further, an average fiber length of the organic filler derived from a natural product (C) subjected to the filament-pelletization is preferably 3 to 12 mm. The average fiber length refers to an average fiber length of the organic filler derived from a natural product (C) of the aromatic polycarbonate resin composition of the present invention, which has been subjected to the filament-pelletization. Note that the average fiber length is equal to a length of the filament-pellet (distance between cut surfaces), and hence the length of the pellet can be determined by using a caliper or the like.

As the organic filler derived from a natural product (C) of the present invention, an organic filler derived from a natural product subjected to the filament-pelletization is preferred as described above, an organic filler derived from a natural product which is subjected to the filament-pelletization and has the average fiber length of 3 to 12 mm is more preferably used, and an organic filler derived from a natural product which is obtained by subjecting at least one kind selected from jute fiber, rayon fiber, bamboo fiber, kenaf fiber, and hemp fiber to the filament-pelletization and has the average fiber length of 3 to 12 mm is still more preferably used.

As the organic filler derived from a natural product (C), at least one kind selected from the above-mentioned organic fillers, and the compounding ratio of the organic filler derived from a natural product (C) contained in the aromatic polycarbonate resin composition of the present invention is, based on the total amount of components (A), (B), and (C), 1 to 80 mass % and preferably 3 to 40 mass %.

To the aromatic polycarbonate resin composition of the present invention, 0.01 to 10 parts by mass of at least one kind selected from a carbodiimide compound, an epoxy compound, an isocyanate compound, and an oxazoline compound (D) can be further compounded with respect to 100 parts by mass of the combination composed of the components (A), (B), and (C). It is preferred to compound the carbodiimide compound, carbodiimide compound and the isocyanate compound, or the carbodiimide compound and the oxazoline compound. The compounding amount thereof is preferably set to 10 parts by mass or less to thereby enable to promote reactive compatibilization of respective components and to stabilize the component (B).

The carbodiimide compound is a compound having one or more carbodiimide groups in a molecule, and also includes a polycarbodiimide compound. Examples of a method of producing the carbodiimide compounds include the following method: as the catalyst, for example, organic phosphorous compounds such as O,O-dimethyl-O-(3-methyl-4-nitrophenyl)phosphorothioate, O,O-dimethyl-O-(3-methyl-4-(methylthio)phenyl)phosphorothioate, and O,O-dimethyl-O-2-isopropyl-6-methylpyrimidine-4-ylphosphorothioate may be used or, for example, organic metal compounds such as rhodium complexes, titanium complexes, tungsten complexes, and paradium complexes may be used; and each polyisocyanate compound is subjected to decarbonation polycondensation at a temperature of 70° C. or more in the absence of a solvent or in an inactive solvent (such as hexane, benzene, dioxane, or chloroform).

Examples of the monocarbodiimide compound included in the carbodiimide compound include dicyclohexyl carbodiimide, diisopropyl carbodiimide, dimethyl carbodiimide, diisobutyl carbodiimide, dioctyl carbodiimide, diphenyl carbodiimide, and dinaphthyl carbodiimide. Of those, dicyclohexyl carbodiimide and diisopropyl carbodiimide are preferred because they are readily industrially available.

Examples of the epoxy compound include compounds having one or more epoxy groups in the molecule. Specifically, alicyclic epoxy compounds such as epoxidized soybean oil, epoxidized linseed oil, epoxy butyl stearate, epoxy octylstearate, phenyl glycidyl ether, allyl glycidyl ether, p-butylphenyl glycidyl ether, styrene oxide, neohexene oxide, diglycidyl adipate, diglycidyl sebacate, diglycidyl phthalate, bis-epoxy dicyclopentadienyl ether, ethylene glycol diglycidyl ether, propylene glycol diglycidyl ether, polyethylene glycol diglycidyl ether, butadiene diepoxide, tetraphenylethylene epoxide, epoxidated polybutadiene, epoxidated styrene-butadiene copolymers, epoxidated hydrogenated styrene-butadiene copolymers, bisphenol A-type epoxy compounds, bisphenol S-type epoxy compounds, phenol-novolak-type epoxy compounds, resorcinol-type epoxy compounds, 3,4-epoxycyclohexamethyl-3,4-epoxycyclohexyl carboxylate, and 3,4-epoxycyclohexyl glycidyl ethers.

Examples of the isocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydro naphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethyl xylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, and 1,3-bis(isocyanatemethyl)cyclohexane.

The isocyanate compound can be easily produced by any known method, and any appropriate commercially available product may be used. Examples of commercially available polyisocyanate compounds include hexamethylene diisocyanate "TAKENATE" (registered trademark) manufactured by MITSUI CHEMICALS POLYURETHANES, INC., a hydrogenated diphenylmethane diisocyanate "CORONATE" (registered trademark) manufactured by NIPPON POLYURETHANE INDUSTRY CO., LTD., and aromatic isocyanate "MILLIONATE" (registered trademark) manufactured by NIPPON POLYURETHANE INDUSTRY CO., LTD.

Examples of the oxazoline compound include 2,2'-o-phenylene bis(2-oxazoline), 2,2'-m-phenylene bis(2-oxazoline), 2,2'-p-phenylene bis(2-oxazoline), 2,2'-p-phenylene bis(4-methyl-2-oxazoline), 2,2'-m-phenylene bis(4-methyl-2-oxazoline), 2,2'-p-phenylene bis(4,4-dimethyl-2-oxazoline), 2,2'-m-phenylene bis(4,4'-dimethyl-2-oxazoline), 2,2'-ethylene bis(2-oxazoline), 2,2'-tetramethylene bis(2-oxazoline), 2,2'-hexamethylene bis(2-oxazoline), 2,2'-octamethylene bis(2-oxazoline), 2,2'-ethylene bis(4-methyl-2-oxazoline), and 2,2'-diphenylene bis(2-oxazoline). Further, reactive polystyrene containing an oxazoline group may also be used as an oxazoline-based compound.

The aromatic polycarbonate resin composition of the present invention can contain, if required, an additive component normally used in an aromatic polycarbonate resin in addition to the above-mentioned essential components and optional components. Examples of the additive component may include plasticizers, stabilizers, inorganic fillers, flame retardants, silicon-based compounds, and fluorine resins. The compounding amount of the additive component is not particularly limited as long as the characteristics of the aromatic polycarbonate resin composition of the present invention are retained.

The polycarbonate resin composition of the present invention can be obtained by compounding the aforementioned respective components by an ordinary method and then melt-kneading the components. In this case, the compounding and kneading are performed, for example, by the following method: preliminarily mixing respective components with a ribbon blender, a drum tumbler, or the like: and using a Henschel mixer (registered trademark), a Banbury mixer, a single-screw extruder, a twin-screw extruder, a multi-screw extruder, a cokneader, or the like. Heating temperature in melt-kneading is generally about 200 to 320° C., and is suitably selected preferably from the range of 220 to 280° C.

In order to subject the organic filler derived from a natural product (C) to be used in the present invention to the melt-kneading, the following methods can be taken: a method of finely pulverizing the organic filler derived from a natural product (C) so as to be in a powder form; a method of using the organic filler derived from a natural product (C) which is compressed and formed into a tablet; a method involving pulverizing a nonwoven fabric of the organic filler derived from a natural product (C) impregnated with a resin and adding the resultant to a composition; and, in the case of a string-shaped organic filler derived from a natural product, a method involving subjecting the string-shaped organic filler derived from a natural product to the filament-pelletization through pultrusion molding beforehand, by using the resin to be used for the resin composition of the present invention and then using the resultant.

Further, it is also possible to obtain a filament-pellet by impregnating a molten resin obtained by being kneaded by using twin-screw extruder or the like with the string-shaped organic filler derived from a natural product and subjecting the resultant to pultrusion molding.

The polycarbonate resin composition of the present invention can be, using the melt-kneaded product or the obtained pellet as a raw material, formed into a molded article by employing, for example, hollow molding, injection molding, extrusion molding, vacuum molding, pressure molding, heat bending molding, calendar molding, or rotational molding. The present invention also provides a molded article formed of the aromatic polycarbonate resin composition of the present invention.

EXAMPLES

Hereinafter, the present invention is described in more detail by way of examples, but is in no way limited thereto.

Performance evaluations were performed in accordance with the following determination method.

(1) Rigidity Test

Tensile elastic modulus: determined in accordance with JIS K 7161. (unit: MPa)

Bending elastic modulus: determined in accordance with ASTM D 790. (unit: MPa)

(2) Density Determination

Density was determined in accordance with JIS K 7112. Test condition: [measurement temperature: 23° C.], (unit: $kg/m^3$)

(3) Fluidity Test

Melt flow rate (MFR): determined in accordance with JIS K 7210. Test conditions: [temperature: 240° C., load: 21.18 N], unit: g/10 min)

(4) External Appearance

External appearance was confirmed by visual observation.
Good: poor external appearance such as flaw mark or pearly luster was not observed
Fair: poor external appearance was partially observed at a gate part and the like of a molded article
Poor: poor external appearance was observed entirely on a molded article Examples 1 to 9 and Comparative Examples 1 to 9

The compounding raw materials were each dried and then uniformly blended by using a tumbler at compounding ratios each shown in Tables 1 and 2. Next, the blended products were each kneaded by a twin-screw kneader and pelletized.

The obtained pellets were each molded by using an injection molding machine and desired test pieces were obtained. The results of the performance evaluations performed by using those test pieces are shown in Tables 1 and 2.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Compounding components (part(s) by mass) | | | | | | | | | | |
| (A) | Aromatic polycarbonate | 60 | 65 | 55 | 60 | 60 | 60 | 50 | 40 | 30 |
| (B) | Aliphatic polyester 1 | 30 | 30 | | 20 | 30 | | 30 | 30 | 40 |
| | Aliphatic polyester 2 | | | 35 | 10 | | 30 | | | |
| (C) | Organic filler derived from a natural product 1 | 10 | 5 | 10 | 10 | | 5 | 20 | 30 | 30 |
| | Organic filler derived from a natural product 2 | | | | | 10 | 5 | | | |
| Inorganic filler 1 | | | | | | | | | | |
| Inorganic filler 2 | | | | | | | | | | |
| Epoxy compound | | | | | | | 1 | | | |
| Carbodiimide compound | | 1 | 1 | 1 | 1 | 1 | | 1 | 1 | 1 |
| Isocyanate compound | | 1 | | | 1 | | | | 1 | |
| Oxazoline compound | | | | | 1 | | | | | 1 |
| Test items | | | | | | | | | | |
| Elastic modulus | Bending (MPa) | 3,700 | 3,100 | 3,000 | 3,300 | 3,500 | 3,300 | 4,000 | 4,300 | 4,500 |
| | Tensile (Mpa) | 3,800 | 3,200 | 3,200 | 3,400 | 3,400 | 3,200 | 3,900 | 4,200 | 4,500 |
| Fluidity (g/10 min) | | 20 | 14 | 18 | 22 | 25 | 24 | 30 | 39 | 44 |
| Density ($kg/m^3$) | | 1.22 | 1.21 | 1.21 | 1.22 | 1.23 | 1.23 | 1.24 | 1.24 | 1.24 |
| External appearance | | Good | Good | Good | Good | Good | Good | Good | Good | Good |

TABLE 2

| | Comparative Examples | | | | | | |
|---|---|---|---|---|---|---|---|
| | 1 | 2 | 3 | 4 | 5 | 6 | 7 |
| Compounding components (part(s) by mass) | | | | | | | |
| (A) Aromatic polycarbonate | 60 | 60 | 70 | 70 | 50 | 40 | 30 |
| (B) Aliphatic polyester 1 | 30 | 30 | 30 | | 50 | 60 | 70 |
| (B) Aliphatic polyester 2 | | | | 30 | | | |
| Inorganic filler 1 | 10 | | | | | | |
| Inorganic filler 2 | | 10 | | | | | |
| Epoxy compound | | | | | | | |
| Carbodiimide compound | | | 1 | 1 | 1 | 1 | 1 |
| Isocyanate compound | | | | | | 1 | |
| Oxazoline compound | | | | | | | 1 |
| Test items | | | | | | | |
| Elastic modulus Bending (MPa) | 3,500 | 3,800 | 2,500 | 1,800 | 3,000 | 3,100 | 3,200 |
| Elastic modulus Tensile (Mpa) | 3,600 | 4,000 | 2,600 | 1,900 | 3,000 | 3,100 | 3,200 |
| Fluidity (g/10 min) | 5 | 7 | 8 | 8 | 20 | 24 | 26 |
| Density (kg/m$^3$) | 1.30 | 1.29 | 1.21 | 1.21 | 1.22 | 1.22 | 1.23 |
| External appearance | Poor | Poor | Poor | Fair | Poor | Poor | Poor |

In Tables 1 and 2, materials used for the components (A) to (D) are as follows.

Aromatic polycarbonate resin: "Taflon" (registered trademark), A1900 (manufactured by Idemitsu Kosan Co., Ltd.)

Aliphatic polyester 1: "LACEA" (registered trademark), H-100 (manufactured by Mitsui Chemicals, Inc., polylactic acid)

Aliphatic polyester 2: "GSPla" (registered trademark), AZ81T (manufactured by Mitsubishi Chemical Corporation, polybutylene succinate, Tg: −32° C.)

Organic filler derived from a natural product 1: Filament-pellets each containing fibers having the same fiber length as the pellet length were prepared through a method involving, by using a filament-pellet producing apparatus (manufactured by Kobe Steel, Ltd.), impregnating a bare continuous fiber of jute with a polylactic acid in a molten state, cooling the resultant, and then cutting the resultant. Note that the average fiber length of the pellet determined as described above was 4 mm.

Organic filler derived from a natural product 2: Filament-pellets each containing fibers having the same fiber length as the pellet length were prepared through a method involving, by using a filament-pellet producing apparatus (manufactured by Kobe Steel, Ltd.), impregnating a bare continuous fiber of rayon with a polylactic acid in a molten state, cooling the resultant, and then cutting the resultant. Note that the average fiber length of the pellet determined as described above was 4 mm.

Inorganic filler 1: glass fibers (GF): "Glasslon" chopped strands 03MA409C (manufactured by Asahi Fiber Glass Co., Ltd.)

Inorganic filler 2: carbon fibers (CF): "PYROFIL" TR06U (manufactured by Mitsubishi Rayon Co., Ltd.)

Epoxy compound: "EPICLON" (registered trademark), AM-040-P (manufactured by DIC Corporation, bisphenol A epoxy resin)

Carbodiimide compound: "Carbodilite" (registered trademark), LA-1 (manufactured by Nisshinbo Industries, Inc., dicyclohexylcarbodiimide)

Isocyanate compound: "Takenate" (registered trademark), 600 (manufactured by Mitsui Chemicals Polyurethanes, Inc., 1,3-bis(isocyanatemethyl)cyclohexane)

Oxazoline compound: "EPOCROS" (registered trademark), RPS-1005 (manufactured by Nippon Shokubai Co., Ltd., reactive polystyrene containing an oxazoline group)

The followings are found from Tables 1 and 2.

(1) From Examples 1 to 6 and Comparative Examples 3 and 4, it is revealed that the fibrous organic filler derived from a natural product, which has been subjected to filament-pelletization, is added to the composition, whereby large increase in density is suppressed, while elastic modulus is improved to a large extent, fluidity is improved, and external appearance becomes good.

(2) From Examples 1 to 6 and Comparative Examples 1 and 2, it is revealed that, compared with the conventional inorganic fillers, improvement in elastic modulus is slightly small, but fluidity does not decrease, increase in density is suppressed, and external appearance becomes good.

(3) From Example 4, it is revealed that it is also effective to use two kinds of the aliphatic polyester components.

(4) From Example 6, it is revealed that it is also effective to use two kinds of the fibers.

(5) From Examples 7 to 9 and Comparative Examples 5 and 7, it is revealed that the compositions in which the amounts of aliphatic polyester components and natural fibers are increased also have, compared with the compositions in which fibers are not added, effects of increase in elastic modulus and improvement in fluidity.

INDUSTRIAL APPLICABILITY

The aromatic polycarbonate resin composition of the present invention, in which increase in density of the aromatic polycarbonate resin/the polyester resin is suppressed, is excellent in rigidity, fluidity, external appearance, and the like.

Accordingly, it is expected that the aromatic polycarbonate resin composition of the present invention expands fields of application thereof to an office automation apparatus, an information and telecommunications device, an automobile part, a housing or a part of electrical and electronic equipment such as a household electric appliance, and further, to an automobile part and the like.

The invention claimed is:

1. An aromatic polycarbonate resin composition, comprising:
   98 to 1 mass % of an aromatic polycarbonate (A);
   1 to 98 mass % of an aliphatic polyester (B); and
   1 to 80 mass % of an organic filler derived from a natural product (C), wherein the organic filler derived from a natural product (C) is obtained by a process comprising filament-pelletizing a natural product to obtain an organic filler derived from a natural product (C) having an average fiber length of 3 to 12 mm and wherein the organic filler derived from a natural product (C) comprises aluminum, silicon, calcium, sulfur, and magnesium.

2. The aromatic polycarbonate resin composition according to claim 1, comprising:
   80 to 20 mass % of the aromatic polycarbonate (A);
   17 to 70 mass % of the aliphatic polyester (B); and
   3 to 40 mass % of the organic filler derived from a natural product (C).

3. The aromatic polycarbonate resin composition according to claim 2, comprising:
   80 to 50 mass % of the aromatic polycarbonate (A);
   17 to 50 mass % of the aliphatic polyester (B); and
   3 to 30 mass % of the organic filler derived from a natural product (C).

4. The aromatic polycarbonate resin composition according to claim 1, wherein the aliphatic polyester (B) comprises at least one kind selected from the group consisting of polylactic acid, polybutylene succinate, polybutylene adipate, and polycaprolactone.

5. The aromatic polycarbonate resin composition according to claim 1, wherein the organic filler derived from a natural product (C) is obtained by a process comprising subjecting at least one kind of natural product selected from jute fiber, rayon fiber, bamboo fiber, kenaf fiber, and hemp fiber to filament-pelletization.

6. The aromatic polycarbonate resin composition according to claim 1, further comprising 0.01 to 10 parts by mass of at least one kind selected from the group consisting of a carbodiimide compound, an epoxy compound, an isocyanate compound, and an oxazoline compound (D) with respect to 100 parts by mass of the combination composed of the aromatic polycarbonate (A), the aliphatic polyester (B), and the organic filler derived from a natural product (C).

7. A molded article formed of the aromatic polycarbonate resin composition according to claim 1.

8. The aromatic polycarbonate resin composition according to claim 1, wherein the natural product is first impregnated with an aliphatic polyester and then filament pelletized to produce the organic filler derived from a natural product (C).

9. The aromatic polycarbonate resin composition according to claim 8, wherein the aliphatic polyester impregnated into the natural product is the aliphatic polyester (B).

10. The aromatic polycarbonate resin composition according to claim 8, wherein the aliphatic polyester impregnated into the natural product is polylactic acid.

11. The aromatic polycarbonate resin composition according to claim 1, wherein the organic filler derived from a natural product (C) has an average fiber length of 5.1 to 12 mm.

12. The aromatic polycarbonate resin composition according to claim 1, wherein the organic filler derived from a natural product (C) comprises cellulose.

13. The aromatic polycarbonate resin composition according to claim 1, further comprising 0.01 to 10 parts by mass of a carbodiimide compound (D) with respect to 100 parts by mass of the combination composed of the aromatic polycarbonate (A), the aliphatic polyester (B), and the organic filler derived from a natural product (C).

14. The aromatic polycarbonate resin composition according to claim 1, wherein the aromatic polycarbonate (A) is obtained by a process comprising reacting a dihydric phenol and a carbonate precursor.

15. The aromatic polycarbonate resin composition according to claim 1, wherein when the total quantity of aluminum, silicon, calcium, sulfur, and magnesium in the organic filler derived from a natural product (C) is 100%, aluminum is present in an amount of 1 to 60 mass %, silicon is present in an amount of 20 to 90 mass %, calcium is present in an amount of 1 to 30 mass %, sulfur is present in an amount of 1 to 20 mass %, and magnesium is present in an amount of 0.1 to 20 mass %.

16. An aromatic polycarbonate resin composition, comprising
   98 to 1 mass % of an aromatic polycarbonate (A);
   1 to 98 mass % of an aliphatic polyester (B); and
   1 to 80 mass % of an organic filler derived from a natural product (C), wherein the organic filler derived from a natural product (C) is obtained by a process comprising filament-pelletizing a natural product to obtain an organic filler derived from a natural product (C) having an average fiber length of 3 to 12 mm, the organic filler derived from a natural product (C) comprises at least one element selected from the group consisting of aluminum, silicon, calcium, sulfur, magnesium, and titanium, and, wherein when the total quantity of aluminum, silicon, calcium, sulfur, and magnesium in the organic filler derived from a natural product (C) is 100%, aluminum is present in an amount of 3 to 50 mass %, silicon is present in an amount of 25 to 80 mass %, calcium is present in an amount of 3 to 20 mass %, sulfur is present in an amount of 2 to 10 mass %, magnesium is present in an amount of 0 to 8 mass %, and titanium is present in an amount of 0 to 3 mass %.

* * * * *